(12) United States Patent
Eberbach

(10) Patent No.: US 10,884,545 B2
(45) Date of Patent: Jan. 5, 2021

(54) ASSISTIVE USER INTERFACE TOUCH DETECTION BASED ON TIME AND PROXIMITY TO TARGET

(71) Applicant: International Business Machine Corporation, Armonk, NY (US)

(72) Inventor: Adam H. Eberbach, Surrey Hills (AU)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/187,936

(22) Filed: Jun. 21, 2016

(65) Prior Publication Data

US 2017/0364206 A1    Dec. 21, 2017

(51) Int. Cl.
 *G06F 3/041*    (2006.01)
 *G06F 3/0488*    (2013.01)

(52) U.S. Cl.
 CPC .......... *G06F 3/0418* (2013.01); *G06F 3/0488* (2013.01)

(58) Field of Classification Search
 CPC ............................ G06F 3/0418; G06F 3/04883
 See application file for complete search history.

(56) References Cited

U.S. PATENT DOCUMENTS

| | | | |
|---|---|---|---|
| 8,319,746 B1 * | 11/2012 | Ho ........................ | G06F 3/0418 345/156 |
| 2004/0056845 A1 | 3/2004 | Harcom et al. | |
| 2006/0026521 A1 | 2/2006 | Hotelling et al. | |
| 2006/0227115 A1 | 10/2006 | Fry | |
| 2011/0012840 A1 * | 1/2011 | Hotelling ................ | G06F 3/044 345/173 |
| 2013/0090807 A1 | 4/2013 | Kojima et al. | |
| 2013/0205210 A1 * | 8/2013 | Jeon .................... | G06F 3/04883 715/716 |
| 2014/0160070 A1 * | 6/2014 | Miyamoto ............ | G06F 3/0416 345/174 |
| 2015/0020029 A1 * | 1/2015 | Lee ......................... | G06F 3/016 715/825 |
| 2015/0052400 A1 * | 2/2015 | Garrett ................ | G06F 11/3656 714/37 |
| 2015/0338951 A1 * | 11/2015 | Lee ......................... | G06F 3/044 345/174 |

FOREIGN PATENT DOCUMENTS

| | | | |
|---|---|---|---|
| EP | 2983092 A1 | 2/2016 | |
| JP | 5855771 B2 | 2/2016 | |

* cited by examiner

*Primary Examiner* — Sahlu Okebato
(74) *Attorney, Agent, or Firm* — Harrington & Smith

(57) ABSTRACT

A method comprises receiving a gesture as an input to a display screen; detecting the gesture via a controller; determining whether the gesture was received on a target touch interface or in a defined area adjacent to the target touch interface; determining whether the gesture was intended to be received on the target touch interface; and providing an output based on the determination of whether the gesture was intended to be received on the target touch interface. Determining whether the gesture was intended to be received on the target touch interface comprises measuring a length of time of contact of the gesture with the display screen and measuring a proximity of a point of contact of the gesture from the touch interface.

20 Claims, 3 Drawing Sheets

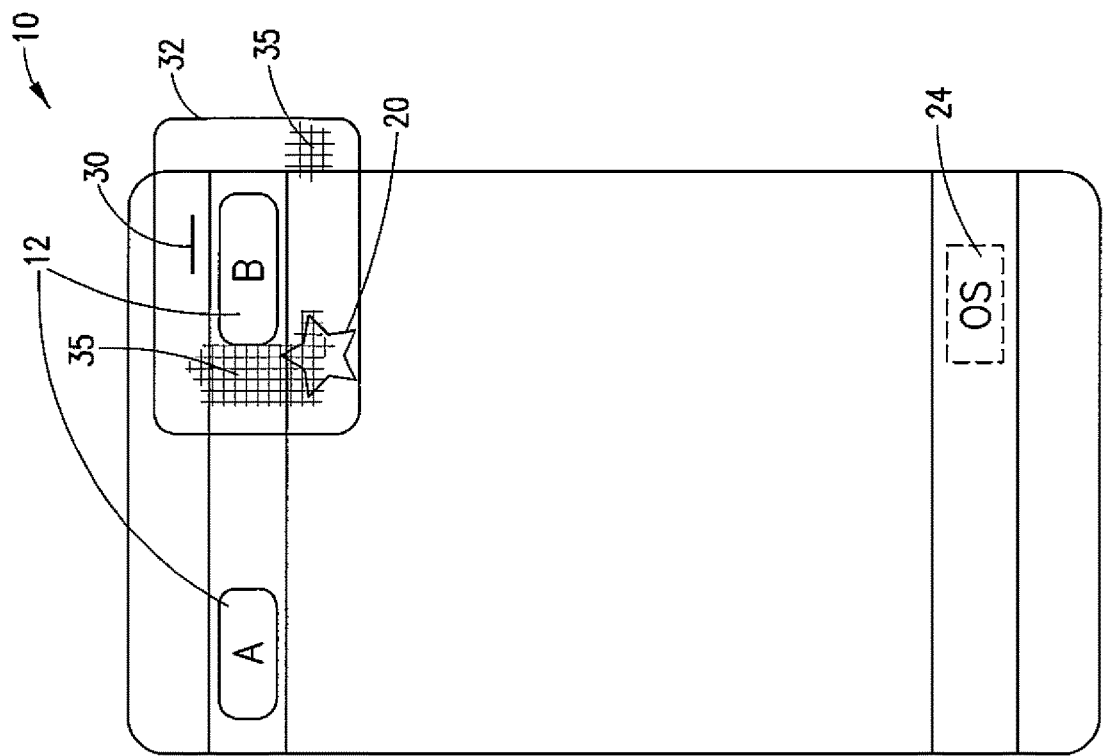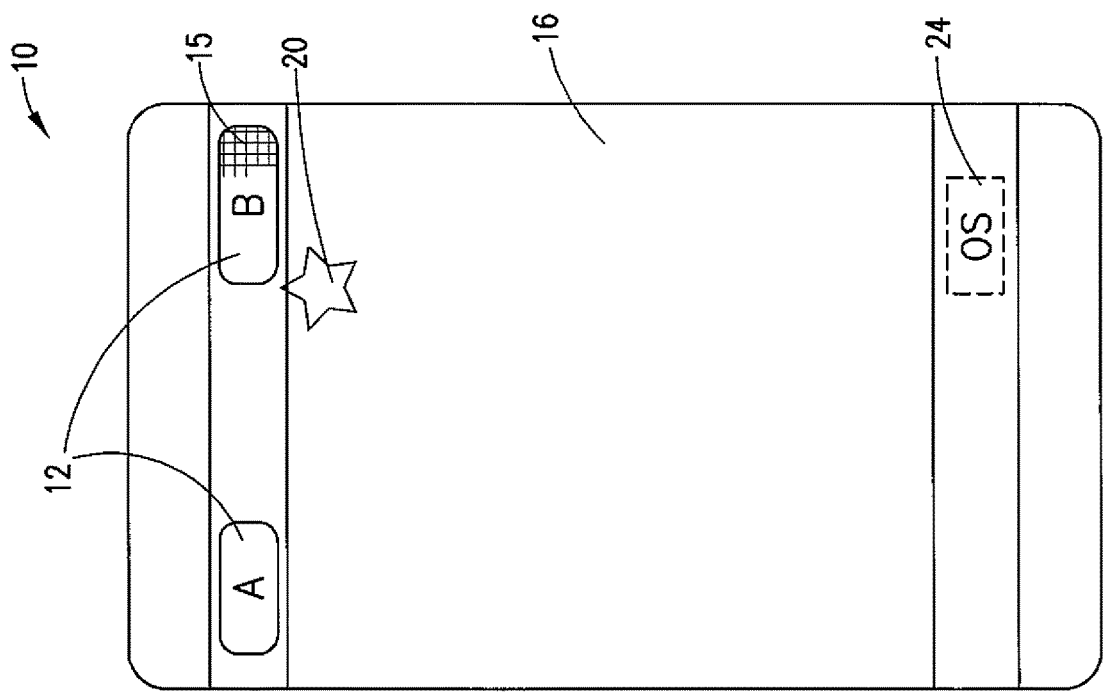

ASSISTIVE USER INTERFACE TOUCH DETECTION BASED ON TIME AND PROXIMITY TO TARGET

BACKGROUND

The exemplary embodiments of this invention relate generally to touch detection in electronic devices and, more specifically, to techniques that utilize fuzzy touch detection in user interfaces of electronic devices.

Electronic devices incorporating user interfaces based on touch screens are ubiquitous. User inputs to the touch screens are used to control various aspects of such electronic devices. A user of one of these electronic devices generally touches the touch screen within a defined area (touch target) to interact with the electronic device. For various reasons, these touch targets may be relatively small (e.g., touch screen controls in vehicle data input systems generally have smaller screen areas than touch screens in self-serve cash register checkouts). Particularly with smaller screens, a user may encounter difficulty accurately touching the defined area because of a physical condition, environmental conditions such as being in a moving vehicle, or compromised hand-eye coordination, or they may simply miss due to inattention or error.

User interfaces based on touch usually inform the user of the results of a touch or other gesture with immediate feedback. It may be observed that when no feedback is provided, a user will generally persist with the gesture, thus enabling the user interface to measure gesture duration as a meaningful input into an assistive touch detection system, the input being processed and used to provide subsequent feedback. One example of such feedback is the highlight of an icon. However, the highlight of an icon based on gesture duration typically leads to approximation of the desired feedback, which may not be accurate.

In other systems, user interfaces may include areas of strictly defined boundaries within which a touch or other gesture will be detected but a touch or other gesture outside the boundaries will not be detected. In these types of systems, a miss intended as an input will simply not register with the system controls. This binary hit or miss decision is common to many touch interfaces and typically results in frustration on the part of the user.

BRIEF SUMMARY

In one exemplary aspect, an apparatus comprises a display screen comprising at least one touch interface on the display screen, the at least one touch interface comprising a first plurality of touch-sensing pixels, and a gravity field of control adjacent to at least one of the at least one touch interfaces, the gravity field of control comprising a second plurality of touch-sensing pixels; and a controller configured to receive an input from one of the first plurality of touch-sensing pixels and the second plurality of touch-sensing pixels, the controller being further configured to process the received input by measuring a length of time of contact of the input on the first plurality of touch-sensing pixels or the second plurality of touch-sensing pixels and measuring a proximity of a point of contact of the input from the at least one touch interface to determine whether the input is intended for the at least one touch interface, and the controller being further configured to provide an output based on the processed input.

In another exemplary aspect, a method comprises receiving a gesture as an input to a display screen; detecting the gesture via a controller; determining whether the gesture was received on a target touch interface or in a defined area adjacent to the target touch interface; determining whether the gesture was intended to be received on the target touch interface; and providing an output based on the determination of whether the gesture was intended to be received on the target touch interface. Determining whether the gesture was intended to be received on the target touch interface comprises measuring a length of time of contact of the gesture with the display screen and measuring a proximity of a point of contact of the gesture from the touch interface.

In another exemplary aspect, a computer program product for applying assistive touch detection in an electronic device, the computer program product comprising a computer readable storage medium having program instructions embodied therewith, wherein the computer readable storage medium is not a transitory signal per se, the program instructions executable by a computer to cause the device to perform a method comprises receiving a gesture as an input to a display screen; detecting the gesture via a controller; determining whether the gesture was received on a target touch interface or in a defined area adjacent to the target touch interface; determining whether the gesture was intended to be received on the target touch interface; and providing an output based on the determination of whether the gesture was intended to be received on the target touch interface. Determining whether the gesture was intended to be received on the target touch interface comprises measuring a length of time of contact of the gesture with the display screen and measuring a proximity of a point of contact of the gesture from the touch interface.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein:

FIG. 1 is a schematic representation of an electronic device showing a position of a touch that misses an intended target;

FIG. 2 is a schematic representation of the electronic device of FIG. 1 showing a boundary of a gravity field used for assistive touch detection;

DETAILED DESCRIPTION

Figure 3:
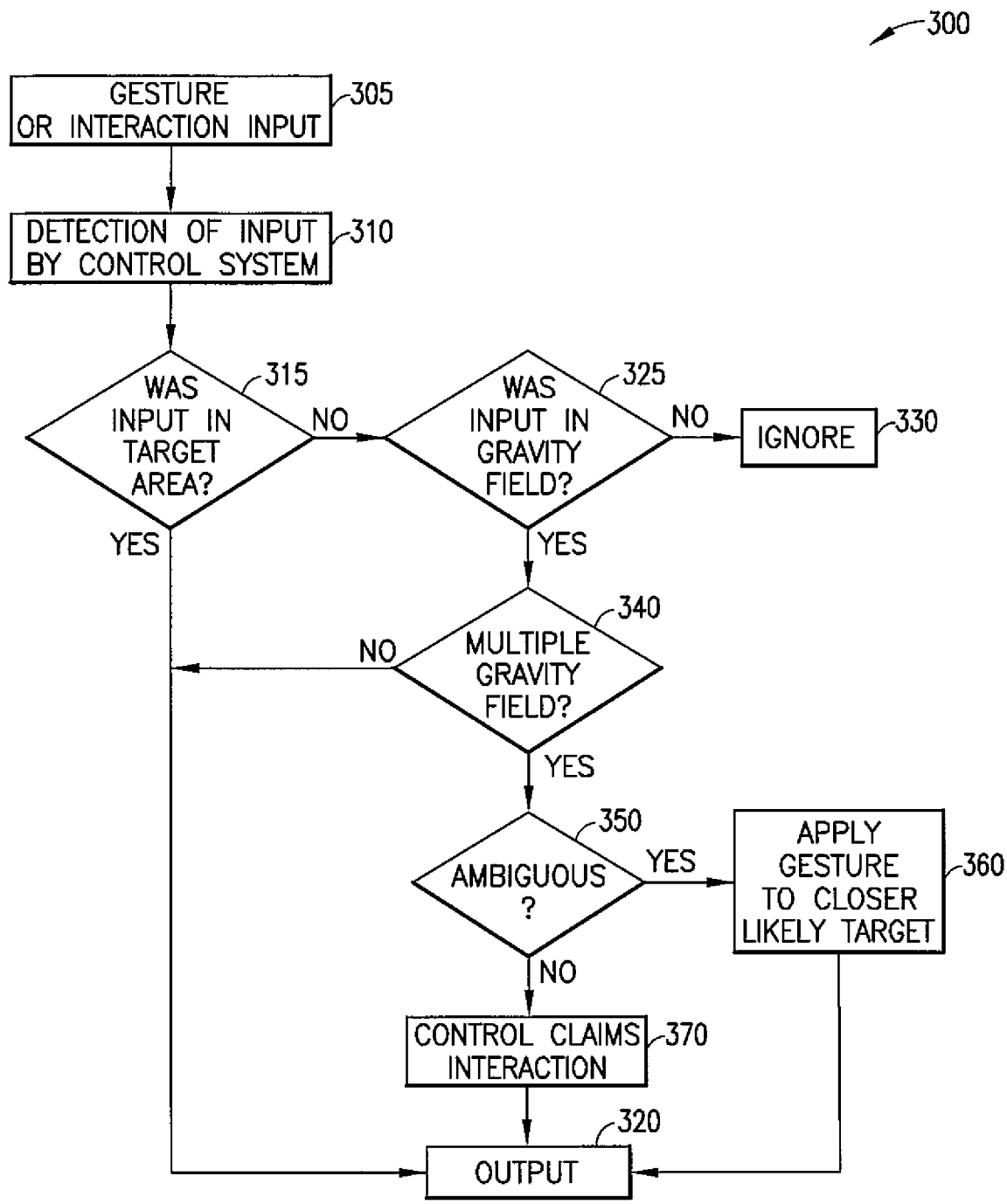
FIG. 3 is a flow diagram of one exemplary embodiment of a method of assistive touch detection for an electronic device.

Referring to FIG. 1, one exemplary embodiment of an electronic device is designated generally by the reference number 10 and is hereinafter referred to as "device 10." Device comprises a display screen 16, a controller such as an operating system 24, and at least one touch interface 12 located on or near the display screen 16 and operably coupled to the operating system 24. Each touch interface 12 comprises a plurality of touch-sensing pixels 15 configured to accept an input 20 in the form of a gesture from a user and to communicate with the operating system 24 of the device 10. The touch interface 12 may be about 44×44 pixels in size, although any number of pixels 15 (and length/width arrangement) may be configured to form the touch interface 12. Although the device 10 illustrates two touch interfaces 12, any number of touch interfaces 12 may be located on the device 10. Each touch interface 12 may be associated with a specified function of the device 10 (e.g., on/off function, climate control adjustment, audio control adjustment, video control adjustment, GPS operation, numerical value, letter input, launchable application operation, and the like).

Referring to FIG. 2, a gravity field of control, designated generally by the reference number 30 and hereinafter referred to as "gravity field 30," is also located adjacent to, around, and/or surrounding the touch interface 12 on the display screen 16. The gravity field 30 extends from outermost edges of the touch interface 12 to a boundary edge 32. Touch-sensing pixels 35 of the gravity field 30 are configured to accept an input 20 and to communicate with the operating system 24. The pixels 35 capture the gesture (e.g., touch, tap, swipe, or the like) and allow for gravity control proximity with an inferred touch intention via fuzzy touch detection. This inferred touch intention with fuzzy touch detection assists the user by making corrections to the touch interface 12, thereby registering the gesture as if the user had accurately selected the intended touch interface 12. As shown, the user has missed the intended target (touch interface 12 designated as "A"), thus resulting in the input 20 being not directly on the touch interface 12. In embodiments employing multiple touch interfaces 12, the touch interfaces 12 may be separated by a sufficient distance to avoid overlapping of the gravity fields 30. However, in some embodiments, the gravity fields 30 for each touch interface 12 may overlap.

Referring now to FIG. 3, one exemplary embodiment of a method for applying relaxed or fuzzy touch detection to touch areas in a user interface is designated generally by the reference number 300 and is hereinafter referred to as "detection method 300." As indicated with regard to the device 10, the touch interface 12 or touch area is positioned on the device 10 to enable an expanded region of touch detection. In using the device 10 with the touch interface 12 to carry out the detection method 300, a gesture or interaction input (touch, tap, swipe, etc.) is presented to the device 10 at input step 305. After the input step 305, a touch area defined by the pixels 15 of the touch interface 12 or the pixels 35 of the gravity field 30 detects the gesture or interaction input in a detection step 310. Detection of the gesture via the pixels may be by the triggering of a sensor, such sensor being capacitive, inductive, optical, optical-electronic, or the like.

After the detection step 310, a decision is made whether to implement the assistive, fuzzy touch detection method, as indicated in a decision step 315. In the decision step 315, the detected gesture is analyzed based on whether the detected gesture was in a "hit area" or in a "supplemental area." The area within the edges of the touch interface 12 defines the "hit area" with the supplemental touch area defined by the gravity field 30 located around the hit area. The gesture is processed to assess whether the gesture was detected by the pixels 15 in the hit area of the touch interface 12. In instances in which the gesture is detected in the hit area, the gesture would be recognized and processed as corresponding to the indicated function, and an appropriate event consistent with the touch interface 12 would be sent to the operating system 24 in an output step 320.

In instances in which the detected gesture is not within the hit area, control is passed to a proximity assessment step 325 to determine whether the detected gesture was in the supplemental touch area defined by the gravity field 30. To carry this out, in the proximity assessment step 325, proximity to the touch interface 12 and length of time of contact with the surface touched may be considered. If the gesture is detected outside of the area bounded by the touch interface 12 but within the area bounded by the edge 32 of the gravity field, a function measuring the length of time of contact with the gravity field 30 and the proximity of the detected gesture to the hit area is used to assess, using a mathematical algorithm, whether or not a user is likely to have intended the gesture as an input 20. If, based on the assessment of the function and following a threshold period defined by time T (to determine if any further input (e.g., corrective input) is forthcoming from the user), the gesture is deemed to have been intended as a valid input 20, and control passes to a multiple gravity field check step 340 for further consideration. If the function measuring the contact time and the proximity detects that the gesture was not likely intended (e.g., outside of the gravity field 30), then control passes to an ignore step 330 and no event is sent to the operating system 24.

If control passes to the multiple gravity field check step 340, an analysis is made regarding whether the gesture was registered between multiple touch interfaces 12, each having gravity fields 30 subject to the assistive touch detection system. If there are no multiple gravity fields 30, an event is sent to the output step 320. However, if the gesture was registered between multiple touch interfaces 12, each having gravity fields 30, control then passes to an ambiguity determination step 350. In the event of ambiguity (e.g., it cannot be definitively stated which touch interface 12 was targeted), control passes to a proximity step 360 in which the gesture is applied to the detection function owned by the nearest of the controls. Where ambiguity still exists and a target control cannot positively be identified, then rather than selecting the closer of the controls having a gravity area encompassing the touch event, the operating system 24 may choose to ignore the touch event. Additionally, the operating system 24 may disqualify controls that would be selected as a result of this process where their action would confirm or initiate a destructive event such as a deletion or other action that would normally require confirmation. If the gesture is applied to the detection function owned by the nearest of the controls, an event is then sent to the output step 320.

However, if based on the ambiguity determination step 350 it is determined that there is no ambiguity (e.g., the gesture cannot be assigned to more than one touch interface 12), then the touch interface 12 claims the interaction in a claiming step 370 and an appropriate event is sent to the operating system 24 and to the output step 320 in the same manner as if the area within the edges of the touch interface 12 had been directly touched. In either resolving the ambiguity through the proximity step 360 or passing control directly through the claiming step 370, the user's intention is satisfied and frustration with the device 10 avoided.

Figure 4:
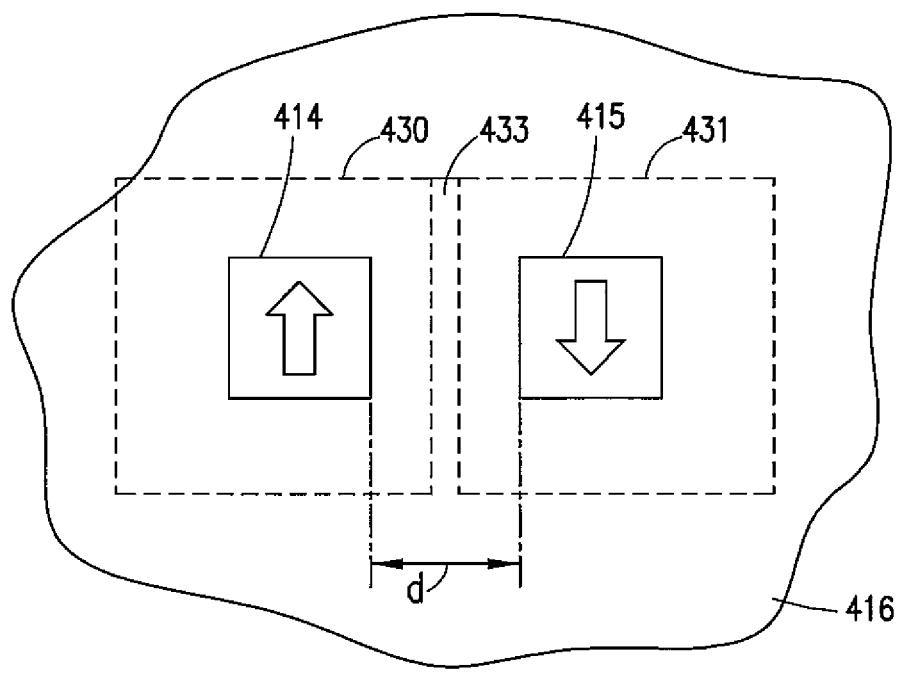
FIG. 4 is a schematic representation of a touch screen of an electronic device.

Referring to FIG. 4, one exemplary embodiment illustrating the utility of the detection method 300 considers a user driving a vehicle equipped with a touch screen as an interface for a climate control adjustment, an audio control, or other system. Such a system should be designed so that it is easy to isolate a first touch interface 414 from a second touch interface 415, with the controls not being placed too close together because of the risk of selecting the wrong one. However, the first touch interface 414 has an associated gravity field 430, and the second touch interface 415 has an associated gravity field 431. As shown, the first touch interface 414 may be separated from the second touch interface 415 on a display screen 416 or other surface by a distance d, but the gravity fields 430, 431 may overlap in an overlap area 433. When the vehicle is in motion, a certain amount of vibration is present and a user may not be able to carefully target a desired touch interface 414, 415 while reaching towards the touch interfaces 414, 415 because of the need to attentively pilot the vehicle. A touch in approximately the right place would succeed in using this assistive system described herein, whereas such a system without the assistive aspects might fall short of expectations due to a very slight error in touch placement relative to the hit area. As indicated above, any embodiment of the detection method 300 described herein would avoid operations having consequences of considerable finality, such as "confirm deletion?" operations.

Figure 5:
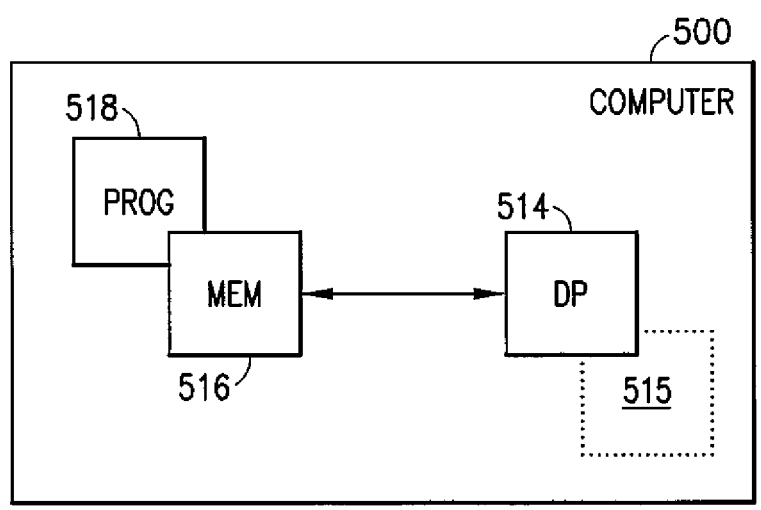
FIG. 5 is a block diagram of one exemplary embodiment of electronic devices that are suitable for use in the assistive touch detection embodiments described herein.

Referring now to FIG. 5, a simplified block diagram of various electronic devices and apparatuses that are suitable for use in practicing the exemplary embodiments described herein is shown. For example, a computer 500 may be used to control one or more of the processes as described above. The computer 500 includes a controller or operating system, such as a computer or a data processor (DP) 514 and a computer-readable memory medium embodied as a memory (MEM) 516 that stores a program of computer instructions (PROG) 518.

The PROG 518 includes program instructions that, when executed by the associated DP 514, enable the various electronic devices and apparatuses to operate in accordance with exemplary embodiments. That is, various exemplary embodiments may be implemented at least in part by computer software executable by the DP 514 of the computer 510, or by hardware, or by a combination of software and hardware (and firmware).

The computer 510 may also include dedicated processors, for example a processor 515 that controls the sensing of gestures within or outside of the boundary edges of the touch interface 12 and the gravity fields 30, as well as the calculations regarding times of contact and distances between various points such as points of inputs 20 and touch interface 12.

The computer readable MEM 516 may be of any type suitable to the local technical environment and may be implemented using any suitable data storage technology, such as semiconductor based memory devices, flash memory, magnetic memory devices and systems, optical memory devices and systems, fixed memory, and removable memory. The DP 514 may be of any type suitable to the local technical environment, and may include one or more of general purpose computers, special purpose computers, microprocessors, digital signal processors (DSPs), and processors based on a multicore processor architecture, as non-limiting examples.

The exemplary embodiments, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise utilizing the exemplary embodiments of the methods described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one exemplary embodiment, an apparatus comprises a display screen comprising at least one touch interface on the display screen, the at least one touch interface comprising a first plurality of touch-sensing pixels, and a gravity field of control adjacent to at least one of the at least one touch interfaces, the gravity field of control comprising a second plurality of touch-sensing pixels; and a controller configured to receive an input from one of the first plurality of touch-sensing pixels and the second plurality of touch-sensing pixels, the controller being further configured to process the received input by measuring a length of time of contact of the input on the first plurality of touch-sensing pixels or the second plurality of touch-sensing pixels and measuring a proximity of a point of contact of the input from the at least one touch interface to determine whether the input is intended for the at least one touch interface, and the controller being further configured to provide an output based on the processed input.

Two or more touch interfaces may be separated from each other by distances such that respective gravity fields of control adjacent to each of the two or more touch interfaces do not overlap. On the other hand, two or more touch interfaces may be separated from each other by distances such that respective gravity fields of control adjacent to each of the two or more touch interfaces overlap. Each of the at least one touch interfaces may be associated with a function of the device selected from the group consisting of on/off function, climate control adjustment, audio control adjustment, video control adjustment, GPS operation, numerical value, letter input, and launchable application operation.

In another exemplary embodiment, a method comprises receiving a gesture as an input to a display screen; detecting the gesture via a controller; determining whether the gesture was received on a target touch interface or in a defined area adjacent to the target touch interface; determining whether the gesture was intended to be received on the target touch interface; and providing an output based on the determination of whether the gesture was intended to be received on the target touch interface. Determining whether the gesture was intended to be received on the target touch interface comprises measuring a length of time of contact of the gesture with the display screen and measuring a proximity of a point of contact of the gesture from the touch interface.

Receiving a gesture as an input to a target touch interface on a display screen may comprise receiving one or more of a touch, tap, and swipe from a user. Determining whether the gesture was intended to be received on the target touch interface may comprise processing the measurement of length of time of contact of the gesture with the display screen and measurement of the proximity of a point of contact of the gesture from the target touch interface and concluding that the gesture was intended. Determining whether the gesture was intended to be received on the target touch interface may comprise processing the measurement of length of time of contact of the gesture with the display screen and measurement of the proximity of a point of contact of the gesture from the target touch interface and concluding that the gesture was not intended. The method may further comprise ignoring the gesture. Determining whether the gesture was intended to be received on the target touch interface may further comprise waiting for a threshold period of time to pass. Determining whether the gesture was received on the target touch interface or in a defined area adjacent to the target touch interface may comprise determining that the gesture was received in a defined area adjacent to the target touch interface that overlaps with a second defined area adjacent to a second touch interface. The gesture may be applied to the closer of the target touch interface and the second touch interface.

In another exemplary embodiment, a computer program product for applying assistive touch detection in an electronic device, the computer program product comprising a computer readable storage medium having program instructions embodied therewith, wherein the computer readable storage medium is not a transitory signal per se, the program instructions executable by a computer to cause the device to perform a method comprises receiving a gesture as an input to a display screen; detecting the gesture via a controller; determining whether the gesture was received on a target touch interface or in a defined area adjacent to the target touch interface; determining whether the gesture was intended to be received on the target touch interface; and providing an output based on the determination of whether the gesture was intended to be received on the target touch interface. Determining whether the gesture was intended to be received on the target touch interface comprises measuring a length of time of contact of the gesture with the display screen and measuring a proximity of a point of contact of the gesture from the touch interface.

The foregoing description has provided by way of exemplary and non-limiting examples a full and informative description of the best method and apparatus presently contemplated by the inventors for carrying out various exemplary embodiments. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments.

Furthermore, some of the features of the preferred embodiments could be used to advantage without the corresponding use of other features. As such, the foregoing description should be considered as merely illustrative of the principles, and not in limitation thereof.

What is claimed is:

1. An apparatus, comprising:
   a display screen, comprising:
   a plurality of touch interfaces on the display screen, the plurality of touch interfaces each comprising a first plurality of touch-sensing pixels and a second plurality of touch-sensing pixels, and
   a controller configured to receive a first input from one of the first plurality of touch-sensing pixels and the second plurality of touch-sensing pixels and a second input from the other of the first plurality of touch-sensing pixels and the second plurality of touch-sensing pixels, the controller being further configured to process the received first input and the second input by
      measuring a length of time of contact of the first input on the first plurality of touch-sensing pixels or the second plurality of touch-sensing pixels,
      measuring a proximity of a single point of contact of the first input on one of the first plurality of touch-sensing pixels and the second plurality of touch-sensing pixels from the second input on the other of the first plurality of touch-sensing pixels and the second plurality of touch-sensing pixels, wherein the second input is an input from a user to correct the first input,
      measuring a length of time to the second input on the other of the first plurality of touch-sensing pixels and the second plurality of touch-sensing pixels, and
      determining whether the first input is intended for the first plurality of touch-sensing pixels by assessing, using a mathematical algorithm, a function based on the measured length of time of contact of the first input and the measured proximity of the single point of contact of the first input from the at least one touch interface, the assessing being after the measuring of the second input, and
   the controller being further configured to provide an output based on the processed input.

2. The apparatus of claim 1, wherein two or more touch interfaces are separated from each other by distances such that respective touch interfaces do not overlap.

3. The apparatus of claim 1, wherein two or more touch interfaces are separated from each other by distances such that respective touch interfaces overlap.

4. The apparatus of claim 1, wherein each of the plurality of touch interfaces is associated with a function of the device selected from the group consisting of on/off function, climate control adjustment, audio control adjustment, video control adjustment, GPS operation, numerical value, letter input, and launchable application operation.

5. A method, comprising:
   receiving a first gesture as an input to a display screen;
   detecting the first gesture via a controller;
   determining whether the first gesture was received on a target touch interface comprising a first plurality of touch-sensing pixels or in a defined area adjacent to the target touch interface, the defined area adjacent to the target touch interface comprising a second plurality of touch-sensing pixels;
   determining whether the first gesture was intended to be received on the first plurality of touch-sensing pixels; and
   providing an output based on the determination of whether the first gesture was intended to be received on the target touch interface;
   wherein determining whether the first gesture was intended to be received on the target touch interface comprises
      measuring a length of time of contact of the first gesture with the display screen,
      measuring a proximity of a single point of contact of the first gesture on one of the first plurality of touch-sensing pixels and the second plurality of touch-sensing pixels from a single point of contact of a second gesture on the other of the first plurality of touch-sensing pixels and the second plurality of touch-sensing pixels, wherein the second gesture is an input to correct the first gesture, and
      measuring a length of time to the second gesture on the other of the first plurality of touch-sensing pixels and the second plurality of touch-sensing pixels with the display screen; and
   wherein determining whether the first gesture was intended further comprises assessing, using a mathematical algorithm, a function based on the measured length of time of contact of the first gesture and the measured proximity of the single point of contact of the first gesture from the at least one touch interface, the assessing being after the measuring of the second gesture.

6. The method of claim 5, wherein receiving the first gesture as the input to the target touch interface on the display screen comprises receiving one or more of a touch, tap, and swipe from a user.

7. The method of claim 5, wherein determining whether the first gesture was intended to be received on the target touch interface comprises processing the measurement of length of time of contact of the first gesture with the display screen and measurement of the proximity of the single point of contact of the first gesture from the target touch interface and concluding that the first gesture was intended.

8. The method of claim 5, wherein determining whether the first gesture was intended to be received on the target touch interface comprises processing the measurement of length of time of contact of the first gesture with the display screen and measurement of the proximity of the single point of contact of the first gesture from the target touch interface and concluding that the first gesture was not intended.

9. The method of claim 8, further comprising ignoring the first gesture.

10. The method of claim 5, wherein measuring the length of time to the second gesture comprises waiting for a threshold period of time to pass.

11. The method of claim 5, wherein determining whether the first gesture was received on the target touch interface or in the defined area adjacent to the target touch interface comprises determining that the first gesture was received in the defined area adjacent to the target touch interface that overlaps with a second defined area adjacent to a second touch interface.

12. The method of claim 11, wherein the first gesture is applied to the closer of the target touch interface and the second touch interface.

13. A computer program product for applying assistive touch detection in an electronic device, the computer program product comprising a computer readable storage medium having program instructions embodied therewith, wherein the computer readable storage medium is not a transitory signal per se, the program instructions executable by a computer to cause the device to perform a method comprising:
receiving a first gesture as an input to a display screen;
detecting the first gesture via a controller;
determining whether the first gesture was received on a target touch interface comprising a first plurality of touch-sensing pixels or in a defined area adjacent to the target touch interface, the defined area adjacent to the target touch interface comprising a second plurality of touch-sensing pixels;
determining whether the first gesture was intended to be received on the first plurality of touch-sensing pixels; and
providing an output based on the determination of whether the first gesture was intended to be received on the target touch interface;
wherein determining whether the first gesture was intended to be received on the target touch interface comprises
measuring a length of time of contact of the first gesture with the display screen,
measuring a proximity of a single point of contact of the first gesture on one of the first plurality of touch-sensing pixels and the second plurality of touch-sensing pixels from a second gesture on the other of the first plurality of touch-sensing pixels and the second plurality of touch-sensing pixels, wherein the second gesture is an input to correct the first gesture, and
measuring a length of time to the second gesture on the other of the first plurality of touch-sensing pixels and the second plurality of touch-sensing pixels with the display screen; and
wherein determining whether the first gesture was intended further comprises assessing, using a mathematical algorithm, a function based on the measured length of time of contact of the first gesture and the measured proximity of the single point of contact of the first gesture from the at least one touch interface, the assessing being after the measuring of the second gesture.

14. The computer program product of claim 13, wherein receiving the first gesture as the input to the target touch interface on the display screen comprises receiving one or more of a touch, tap, and swipe from a user.

15. The computer program product of claim 13, wherein determining whether the first gesture was intended to be received on the target touch interface comprises processing the measurement of length of time of contact of the first gesture with the display screen and measurement of the proximity of a point of contact of the first gesture from the target touch interface and concluding that the first gesture was intended.

16. The computer program product of claim 13, wherein determining whether the first gesture was intended to be received on the target touch interface comprises processing the measurement of length of time of contact of the first gesture with the display screen and measurement of the proximity of a point of contact of the first gesture from the target touch interface and concluding that the first gesture was not intended.

17. The computer program product of claim 16, further comprising ignoring the first gesture.

18. The computer program product of claim 13, wherein measuring the length of time to the second gesture comprises waiting for a threshold period of time to pass.

19. The computer program product of claim 13, wherein determining whether the first gesture was received on the target touch interface or in the defined area adjacent to the target touch interface comprises determining that the first gesture was received in the defined area adjacent to the target touch interface that overlaps with a second defined area adjacent to a second touch interface.

20. The computer program product of claim 19, wherein the first gesture is applied to the closer of the target touch interface and the second touch interface.

* * * * *